March 13, 1962 J. S. MALSBARY 3,025,453
VOLTAGE CONTROL DEVICE
Filed July 28, 1960 2 Sheets-Sheet 1
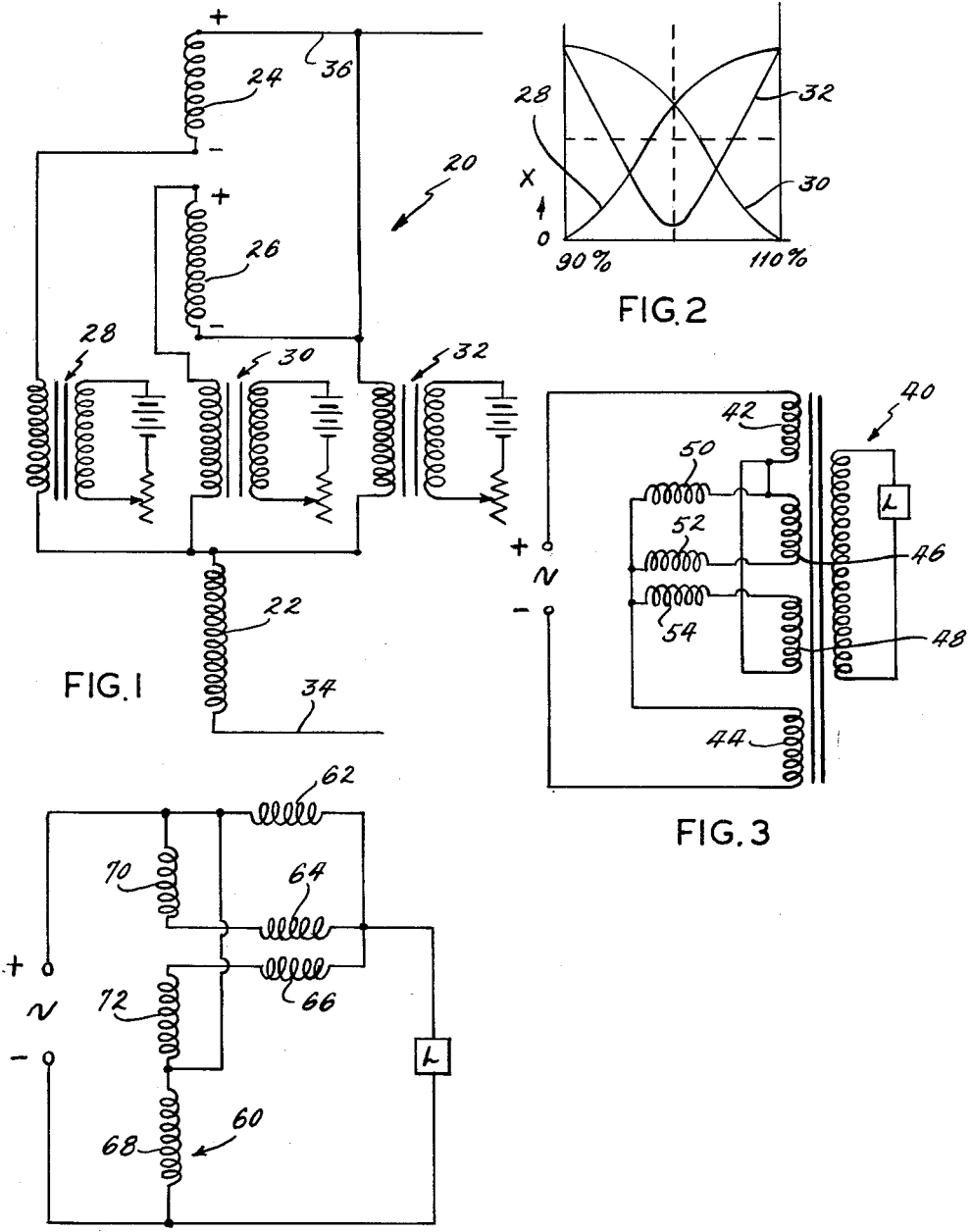
INVENTOR
JAMES S. MALSBARY
BY Gravely, Lieder & Woodruff
ATTORNEYS.

March 13, 1962 J. S. MALSBARY 3,025,453
VOLTAGE CONTROL DEVICE

Filed July 28, 1960 2 Sheets-Sheet 2

INVENTOR:
JAMES J. MALSBARY

BY Gravely, Lieder & Woodruff
ATTORNEYS.

United States Patent Office 3,025,453
Patented Mar. 13, 1962

3,025,453
VOLTAGE CONTROL DEVICE
James S. Malsbary, Glendale, Mo., assignor to Wagner Electric Corporation, St. Louis, Mo., a corporation of Delaware
Filed July 28, 1960, Ser. No. 45,938
7 Claims. (Cl. 323—61)

The present invention relates to voltage control devices in general and more particularly to a voltage regulator for a supply system.

Various devices have been devised and used in the past for regulating voltages of electrical supply systems and particularly alternating current supply systems. The known devices, however, are relatively expensive to make and operate, and in most cases have numerous movable parts such as switches and other components which are subject to wear and arcing. These and other disadvantages of the known devices are in large measure overcome by the present invention which teaches the construction and use of a relatively inexpensive, yet versatile, control device having a minimum number of movable parts, and which is not as subject to wear and arcing as the known devices.

Therefore, it is a principal object of the present invention to provide relatively inexpensive means for controlling and regulating voltage.

Another object is to reduce the number of movable parts in a voltage control device.

Another object is to reduce maintenance and repair costs of voltage control devices.

Another object is to provide a voltage control device that can be connected in either the input or load circuits of a supply system.

Another object is to minimize phase shift in controlled and regulated suply systems.

Another object is to provide voltage control means that do not interrupt the flow of power in the system controlled.

Another object is to provide smooth as distinguished from incremental voltage regulation.

Another object is to improve the accuracy of voltage control devices over the range thereof.

Still another object is to provide extremely fast acting voltage control means.

Briefly, the present device comprises a control circuit for controlling an alternating current voltage employing a pair of winding sections and first, second and third variable impedance devices connected into three parallel circuits with the winding sections, one of said parallel circuits including the first impedance device, and the other two of said circuits including respectively one of said winding sections in series with the second and third impedance devices, said winding sections being connected in said associated parallel circuits to produce fields of different phase, and means for varying the impedances of said impedance devices.

These and other objects and advantages of the present invention will become apparent after considering the following specification covering several preferred embodiments of the invention in conjunction with the accompanying drawings.

In the drawings:

FIG. 1 is a schematic circuit diagram of a device constructed according to the present invention;

FIG. 2 is a graphical representation of the impedances of the reactors of FIG. 1 plotted as a function of supply voltage;

FIG. 3 is a schematic circuit diagram showing the present device used in the input of a transformer;

FIG. 4 is a schematic circuit diagram of the device used with an auto transformer;

Figure 5:
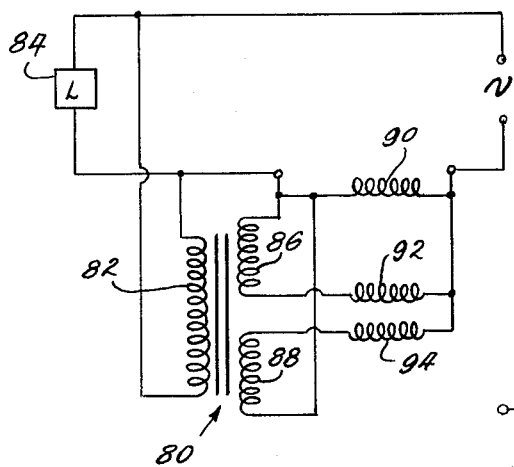
FIG. 5 is a schematic circuit diagram of the device used in a load circuit.

Referring to the drawings by reference numbers, the number 20 in FIG. 1 refers to a supply circuit including voltage control means constructed according to the presen invention.

The supply circuit of FIG. 1 has a main winding 22 and two corrector windings 24 and 26. To simplify the explanation, let it be considered that the windings 22, 24, and 26 are all mounted on the same magnetic core and that all are similarly wound on the core. Therefore, when current passes in the same direction through the windings the winding fields aid, and when current passes in opposite directions through any two of the windings their fields oppose each other.

Three variable reactors 28, 30 and 32 are connected into the circuit. The reactor 28 is connected between the upper end of the main winding 22 and the lower end of the corrector winding 24; the reactor 30 is connected between the upper end of the main winding 22 and the upper end of the corrector winding 26, and the reactor 32 is connected between the upper end of the main winding 22 and a common connection between the upper end of winding 24 and the lower end of winding 26. The lower end of the main winding 22 and the aforementioned common connection between the upper end of winding 24 and lower end of winding 26 are connected respectively to line (or load) leads 34 and 36.

Voltage control or regulation of the above described device is accomplished by varying the impedances of the reactors 28, 30 and 32 to compensate for changes in the line or load voltage. For example, at normal line or load voltage, the impedance of the reactor 32 is adjusted to be relatively low and the impedances of the reactors 28 and 30 relatively high. This means that relatively little current will flow through the corrector windings 24 and 26, and most of the current will be shunted around the corrector windings 24 and 26 by the low impedance of the reactor 32. Therefore, under normal voltage substantially all of the current flows only through the main winding 22.

If the line (or load) voltage drops below normal, and if it is assumed that winding 22 is a secondary winding, the impedance of the reactor 28 is reduced to a lower value and the impedance of the reactor 32 is increased. The impedance of the reactor 30 remains at its relatively high value. Under this condition, a relatively large amount of current flows through the corrector winding 24 and in the same direction as it flows through the main winding 22. Therefore, the effective number of winding turns in the circuit are increased to compensate for the reduced voltage and to maintain the voltage between leads 34 and 36 constant.

If the voltage rises above normal the impedance of the reactor 30 is reduced while the impedances of the reactors 28 and 32 are adjusted to be relatively high. This means that most of the current flowing in the main winding 22 flows through the corrector winding 26. However, the current that flows through the corrector winding 26 is in the opposite direction from the current flowing through the main winding 22, and therefore it reduces the effective winding turns to compensate for the increased voltage.

FIG. 2 shows graphically the above described three conditions as well as some of the many possible inbetween conditions. The curves of the graph of FIG. 2 represent the impedances of the reactors 28, 30 and 32 and are numbered correspondingly.

FIG. 3 shows an adaption of the present device employed in the primary or input circuit of a supply transformer 40. In this case two main transformer windings 42 and 44, two corrector windings 46 and 48 and three variable impedance reactors 50, 52 and 54 are provided. The reactor 50 corresponds to the reactor 32 in FIG. 1, and when the reactor 50 has a very low impedance it shunts the rest of the control circuit and substantially all of the current flows only through the main windings 42 and 44. In this condition, the reactors 52 and 54 are usually set at high reactances. This can be considered as the normal condition of the circuit as for example when the input and load voltages have their desired values.

If the input voltage goes down the impedances of the reactors 50 and 52 are adjusted to be relatively high and the impedance of the reactor 54 is adjusted to be relatively low in order to maintain constant load voltage. Most of the primary current then flows through the main windings 42 and 44 and also through the corrector winding 48. Since the current in winding 48 flows in a direction opposite that of the current in the windings 42 and 44 the number of effective primary turns is reduced to compensate for the decreased input voltage.

The opposite is true if the input voltage goes up. In this situation the number of effective primary turns must be increased, and this is accomplished by adjusting the reactor 52 to have a relatively low impedance and the reactors 50 and 54 to have relatively high impedance. Now, substantially all of the primary current flows through windings 42, 44 and 46. However, the current in winding 46 flows in the same direction as the current in the windings 42 and 44 and therefore the number of effective primary turns increases to compensate for the increase in input voltage. The device of FIG. 3, like the device of FIG. 1, can be connected in the load circuit as well as in the supply circuit and operated in the same or similar manner.

In FIG. 4 is shown an application of the present control circuit employed in conjunction with the load circuit of an auto-transformer 60. Three reactors 62, 64 and 66 are also employed. The reactor 62 corresponds to the reactor 32 of FIG. 1 and when it has a low impedance and the reactors 64 and 66 have high impedances the load is in effect connected across only the main winding portion 68 which is connected across the supply source. When only the reactor 64 has a low impedance then winding 70, the voltage of which is in phase opposition with the supply voltage due to its connection in the circuit, is effective to decrease the number of effective transformer turns; and when only the reactor 66 has low impedance then the voltage of control winding 72, which is in aiding relation with the supply voltage due to its connection in the circuit, is effective to increase the number of transformer turns. In this way, adjustment is made to maintain the load voltage at a desired value.

FIG. 5 shows another application of the present device wherein the device is employed in conjunction with a transformer 80. The transformer 80 has a primary winding 82 connected across a load 84. The transformer 80 also has two other windings 86 and 88 which are connected into a control circuit with three variable impedance reactors 90, 92 and 94. By varying the impedances of the reactors the load voltage may be maintained at a desired normal value regardless of changes in the supply voltage within the range of the device. For example, when the reactor 90 has a relatively low impedance, approaching a short circuit, and the reactors 92 and 94 have relatively high impedance, the supply voltage is connected directly across the load. This is the normal condition of the circuit which occurs when the supply voltage is normal.

When, however, the impedance of the reactor 92 is adjusted to have a relatively low impedance and the reactors 90 and 94 to have high impedances, the secondary winding 86 is substantially in series with the supply source. This produces a compensating voltage of a desired phase for maintaining the load voltage constant. Similarly, if the reactor 94 has low impedance and the reactors 90 and 92 high impedances, the secondary winding 88 is effectively in series with the supply source to produce a compensating voltage to maintain the load voltage constant. In order to cover a range of input voltage variation on both sides of normal input voltage, the windings 86 and 88 are connected so as to produce compensating voltages of opposite phases.

Figure 6:
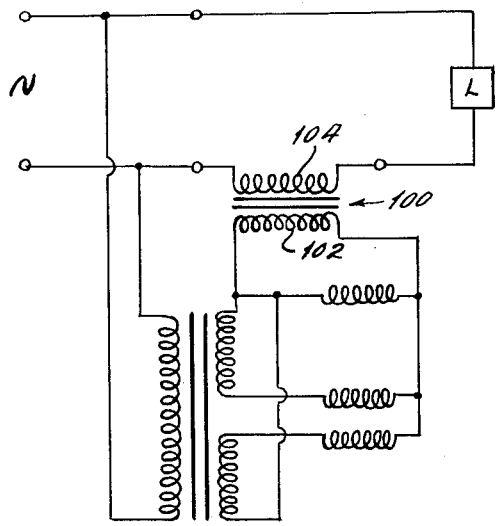
FIG. 6 is a diagram of a circuit similar to FIG. 5 employing a coupling transformer in the load circuit.

In FIG. 6 is shown another form of the subject control device which is similar in operation to the device of FIG. 5. However, instead of connecting the control device itself in series with the load as in FIG. 5, a series coupling transformer 100 is used. The transformer 100 has a primary winding 102 which is connected to a control device similar to the control device of FIG. 5, and a secondary winding 104 which is connected in series with the load across a supply voltage. It is not deemed necessary to describe the operation of the device of FIG. 6 since it is similar to the operation of the device of FIG. 5.

Figure 7:
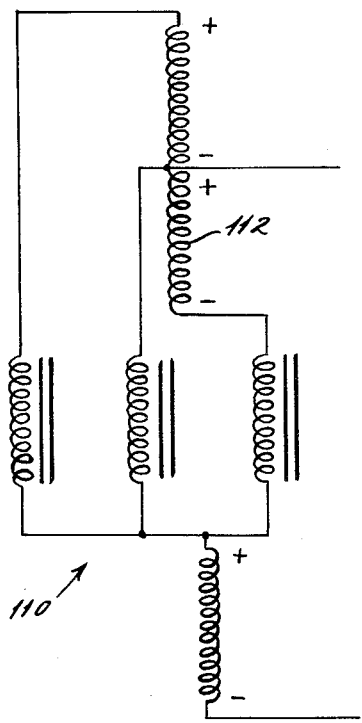
FIG. 7 is a schematic circuit diagram showing a modified form of the circuit of FIG. 1.

Another form of the control device of FIG. 1 is shown in FIG. 7 and is identified generally by number 110. Operation of the modified circuit 110 is similar to that of the circuit of FIG. 1. The main difference between the circuits of FIGS. 7 and 1 is that the FIG. 7 construction employs a single corrector winding 112 having a center tap instead of two separate corrector windings. The FIG. 7 construction may therefore be cheaper to construct in some cases.

In all forms of the invention shown and described herein, it is contemplated to use variable impedance devices such as saturable reactors, resistors and other elements capable of providing an adjustable or variable impedance. It is also contemplated to adjust the impedance of said elements manually or automatically to maintain the desired voltage condition. One form of impedance adjusting means is shown in FIG. 1 in the form of batteries and potentiometers connected in series across direct current windings of the reactors 28, 30 and 32.

Because one of the three reactors has a low reactance value when the supply and load voltages are at their normal or desired values, the phase shift between the supply and load voltages is reduced to a minimum as well as avoiding high harmonics in the output.

Thus it is that there has been shown and described voltage control means which fulfill all of the objects and advantages sought therefor. Briefly, the present control means comprise a circuit having a main winding, a pair of corrector windings associated therewith, and three variable impedance devices connected into circuits with said main and corrector windings, one of said variable impedance devices being connected in a first series circuit with one of said corrector windings for passing current through the associated corrector winding in an in-phase relationship to its voltage, a second of said variable impedance devices being connected in a second series circuit with the other of said pair of corrector windings for passing current through the associated other corrector winding in out-of-phase relationship to its voltage, and the third of said variable impedance devices shunting said first and said second series circuits.

Many changes, variations and modifications of the present invention in addition to those shown and described herein will become apparent to those skilled in the art after considering this specification in conjunction with the accompanying drawings. All such changes, variations and modifications which do not depart from the spirit and scope of the invention are deemed covered by the present invention which is limited only by the claims which follow.

What is claimed is:

1. Voltage control means for an alternating current supply system having an input circuit and an output circuit, said means comprising a main alternating current winding connected in series with a parallel circuit having three branches, one of said branches having a first variable impedance device, a second of said branches having a second variable impedance device and a corrector winding connected in series, and the third of said circuits having a third variable impedance device connected in series with another corrector winding, said corrector windings being connected to said associated variable impedance devices so that the phase relationship between the current and voltage of one of said corrector windings is different than that between the current and voltage of the other of said corrector windings.

2. Voltage control means for an alternating current supply system comprising a source of energy connected across a series circuit including a load and a pair of terminals, a transformer having a primary winding connected across the supply system and a secondary winding having two winding sections each having first and second end connections, one end connection of each of said winding sections being connected to one of said terminals, the other of said end connections being connected respectively to one side of a first and a second impedance device, another side of said first and second impedance devices being connected to the other of said pair of terminals, a third impedance device connected between said terminals, and means for varying the impedance of each of said impedance devices.

3. Voltage control means for an alternating current supply system comprising a source of energy connected across a series circuit including a load and a secondary winding of a first transformer, a second transformer having a first winding connected across the supply system to be energized by the source of energy and a second winding connected to a control circuit including first, second and third reactors, the second winding of said second transformer including a pair of winding sections connected respectively in series circuit with said first and said second reactors across the primary winding of said first transformer and across said third reactor, and means for varying the impedances of said reactors.

4. Voltage control means for an alternating current supply system having a source of energy connected across a series circuit including a load and a first winding of a first transformer, a second winding on said first transformer, a second transformer having one of its windings connected across the system to be energized by the source of energy and having a pair of other winding sections, and a control circuit connected to the second winding of said first transformer and including the pair of winding sections of the second transformer and a first, second, and third variable impedance device, said first impedance device being connected across the second winding of the first transformer, said second and third impedance devices being connected respectively in two series circuits with assoicated ones of said winding sections across said first impedance device, said pair of winding sections being connected to produce magnetic fields of different phase, and means varying the impedances of said first, second and third impedance devices.

5. Voltage control means for an alternating current supply system including an auto transformer having a main winding portion and a pair of corrector winding portions, comprising means connecting said main winding portion across a source of energy and means including a control circuit and a load connected in series across said source, said control circuit including three parallel circuits, one of said parallel circuits including a first reactor, a second of said parallel circuits including a second reactor in series with one of said pair of corrector winding portions, and a third of said parallel circuits including a third reactor in series with the other of said pair of winding portions, said winding portions being connected to produce fields of different phase, and means for independently varying the impedance of each of said reactors.

6. Voltage control means comprising a transformer winding including a pair of winding sections, means for inducing a voltage in each of said sections, a pair of circuit terminals, a first circuit including a first saturable reactor and one of said sections connected in series, a second circuit including a second saturable reactor and the other of said sections connected in series, a third circuit including a third saturable reactor, said circuits being connected in parallel between said terminals, and means for varying the reactance of said reactors.

7. In an alternating current supply system having a power input circuit connected to supply power to a power output circuit, voltage control means comprising a transformer winding including a pair of winding sections, means for inducing a voltage in each of said sections, a variable voltage output circuit including a pair of circuit terminals, a first circuit including a first saturable reactor and one of said sections connected in series, a second circuit including a second saturable reactor and the other of said sections connected in series, a third circuit including a third saturable reactor, said first, second and third circuits being connected in parallel between said terminals of said variable voltage output circuit, means for varying the reactance of said reactors, and means coupling said variable voltage output circuit in series with one of said power circuits.

No references cited.